(12) United States Patent
Zhang

(10) Patent No.: US 10,724,701 B2
(45) Date of Patent: Jul. 28, 2020

(54) LIGHT SOURCE MODULE BASED ON GRADED INDEX LENS, LAMP ASSEMBLY, AND AUTOMOBILE

(71) Applicant: HASCO VISION TECHNOLOGY CO., LTD., Shanghai (CN)

(72) Inventor: Jie Zhang, Shanghai (CN)

(73) Assignee: HASCO VISION TECHNOLOGY CO., LTD., Jiading District, Shanghai (CN)

( * ) Notice: Subject to any disclaimer, the term of this patent is extended or adjusted under 35 U.S.C. 154(b) by 0 days.

(21) Appl. No.: 16/391,335

(22) Filed: Apr. 23, 2019

(65) Prior Publication Data

US 2019/0323673 A1 Oct. 24, 2019

(30) Foreign Application Priority Data

Apr. 24, 2018 (CN) .......................... 2018 1 0369699
Apr. 24, 2018 (CN) ..................... 2018 2 0584120 U

(51) Int. Cl.
*F21S 41/20* (2018.01)
*F21S 41/32* (2018.01)
*F21S 41/147* (2018.01)
*G02B 3/00* (2006.01)
*F21V 7/08* (2006.01)

(52) U.S. Cl.
CPC ........... *F21S 41/285* (2018.01); *F21S 41/147* (2018.01); *F21S 41/32* (2018.01); *F21V 7/08* (2013.01); *G02B 3/0087* (2013.01)

(58) Field of Classification Search
CPC ..................................................... F21S 41/147
See application file for complete search history.

(56) References Cited

U.S. PATENT DOCUMENTS

2007/0201805 A1* 8/2007 Hamada ................. B82Y 20/00
                                                                    385/131
2016/0245471 A1* 8/2016 Nakazato ................ F21S 41/14

\* cited by examiner

*Primary Examiner* — Joseph L Williams
*Assistant Examiner* — Jacob R Stern

(57) ABSTRACT

The present disclosure relates to the field of automobile lamp technologies, and in particular, to a light source module based on a graded index lens, a lamp assembly including the light source module, and an automobile including the lamp assembly. The light source module includes a light source and a graded index lens disposed in front of the light source. Light emitted from the light source is incident to an incident surface of the graded index lens, and is emitted from an out-light surface of the graded index lens after being refracted and converged by using the graded index lens. The graded index lens converges the light emitted from the light source, so that the light has relatively large optical radioactive energy and a relatively small divergence angle on the out-light surface of the graded index lens.

9 Claims, 4 Drawing Sheets

LIGHT SOURCE MODULE BASED ON GRADED INDEX LENS, LAMP ASSEMBLY, AND AUTOMOBILE

CROSS REFERENCES TO RELATED APPLICATION

This application claims the benefits of priority to Chinese Patent Application No. CN 2018103696997, entitled "Light Source Module Based on Graded Index Lens, Lamp Assembly, and Automobile", filed with CNIPA on Apr. 24, 2018, and the benefits of priority to Chinese Patent Application No. CN 2018205841204, entitled "Light Source Module Based on Graded Index Lens, Lamp Assembly, and Automobile", filed with CNIPA on Apr. 24, 2018, the contents of which are incorporated herein by reference in their entirety.

BACKGROUND OF THE PRESENT DISCLOSURE

Field of Disclosure

The present disclosure relates to the field of automobile lamp technology, and in particular, to a light source module based on a graded index lens, a lamp assembly including the light source module, and an automobile including the lamp assembly.

Description of Related Arts

According to laws of a lamp high beam, the maximum value (namely, the Emax value) of the high beam is required to be within a particular brightness range. The maximum value (namely, the Emax value) of the high beam is required to be in the range from 48 lx to 240 lx, and a low beam test value at a 75R test point is required to be not less than 12 lx.

SUMMARY OF THE PRESENT DISCLOSURE

The following technical solutions are provided in the present disclosure:

A light source module based on a graded index lens comprises a light source and a graded index lens disposed in front of the light source. Light emitted from the light source is incident to an incident surface of the graded index lens, and is emitted from an emitting surface of the graded index lens after being refracted and converged by the graded index lens.

Preferably, the light source is a planar light source with Lambertian divergence.

Preferably, refractive indexes of the graded index lens are distributed in stepped descending order from a center to a periphery.

Preferably, the stepped descending order is sequentially cascading in a circumferential direction radially from the center to the periphery of the graded index lens.

Preferably, the stepped descending order is sequentially cascading along a normal of a central plane of the graded index lens from the central plane to the periphery of the graded index lens.

Preferably, refractive indexes of the graded index lens are distributed in radially graded descending order from a center to a periphery, and a distribution curve of the refractive index is:

$$N(r) = N_0\left(1 - \frac{A}{2}r^2\right),$$

wherein in the equation, N is a refractive index of the graded index lens, $N_0$ is a central refractive index of the graded index lens, r is a radius of the graded index lens, and A is a refractive index distribution constant of the graded index lens.

A lamp assembly comprises the foregoing light source module based on a graded index lens.

Preferably, the lamp assembly further comprises a convex lens. The emitting surface of the graded index lens in the light source module is disposed at a focus of the convex lens.

Preferably, the lamp assembly further comprises a reflector, a light shielding plate, and a convex lens. The reflector is a quasi-ellipsoid, and has a near focus and a far focus. The out-light surface of the graded index lens in the light source module is disposed at the near focus of the reflector. The far focus of the reflector is near a focus of the convex lens. The light shielding plate is located at the focus of the convex lens.

An automobile comprises the foregoing lamp assembly.

Compared with the prior art, the present disclosure has significant improvements:

According to the light source module based on a graded index lens, the lamp assembly comprising the light source module, and the automobile comprising the lamp assembly consistent with the present disclosure, a graded index lens is disposed in front of a light source, and the graded index lens converges light emitted from the light source, so that the light has large optical radioactive energy and a small divergence angle on an emitting surface of the graded index lens. Therefore, when the emitting surface of the graded index lens is used as a new planar light source to match other light distribution parts of a lamp, a large high beam Emax value or a large low beam test value at a 75R test point can be obtained with a small output luminous flux of the light source, requirements on light distribution values of different lamp functions are met, and a high illuminance value that a conventional lamp system can hardly implement is implemented. In addition, efficiency of the light source can further be improved, sizes of parts of the lamp are reduced, and a structure of the lamp is simplified.

Figure 1:
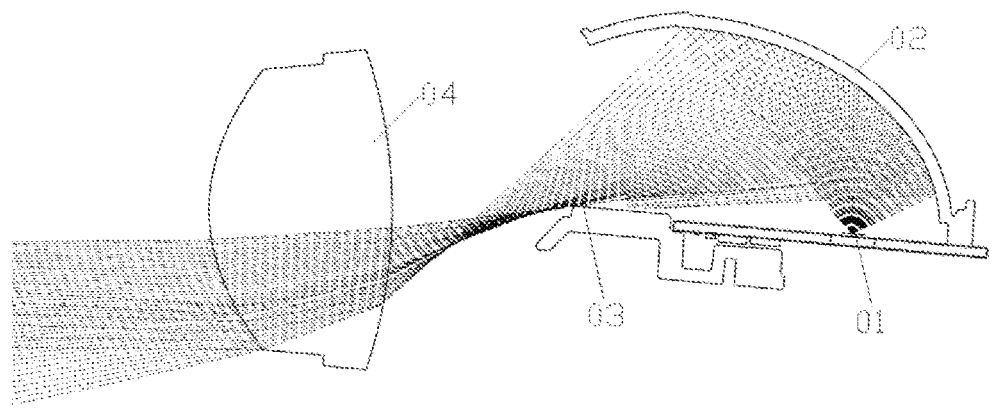
FIG. 1 is a schematic structural diagram of a lighting system including a high beam lamp and a low beam lamp.

| In FIG. 1: | |
| --- | --- |
| 01: LED light source | 02: Reflector |
| 03: Light shielding plate | 04: Convex lens |
| In FIG. 2 to FIG. 11: | |
| 1: Light source | 2: Graded index lens |
| 2a: emitting surface | 11: Single point light source |
| 12: Planar light source | 3: Convex lens |

DETAILED DESCRIPTION OF THE PREFERRED EMBODIMENTS

Specific implementations of the present disclosure are further described in detail below with reference to the accompanying drawings. The implementations are only used to describe the present disclosure, and are not intended to limit the present disclosure.

In the description of the present disclosure, it should be noted that orientations or positional relationships indicated by terms, for example, "central", "longitudinal", "lateral", "above", "below", "front", "behind", "left", "right", "vertical", "horizontal", "top", "bottom", "inside", and "outside", are orientations or positional relationships shown based on the accompanying drawings, and are only for ease of describing the present disclosure and simplifying description, but do not indicate or imply that the referred apparatus or element needs to have a specific orientation, and be constructed and operated in the specific orientation. Therefore, the orientations or positional relationships cannot be understood as a limitation on the present disclosure. In addition, terms such as "first" and "second" are only used for description, but cannot be understood according to dictating or implying relative importance.

In the description of the present disclosure, it should be noted that unless otherwise explicitly specified or defined, the terms such as "mount", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. A person of ordinary skill in the art may understand specific meanings of the foregoing terms in the present disclosure based on specific situations.

In addition, in the description of the present disclosure, unless otherwise stated, "a plurality of" means two or more than two.

In an embodiment, FIG. 1 shows a lighting system including a high beam lamp and a low beam lamp. The lighting system includes an LED light source 01, a reflector 02, a light shielding plate 03, and a convex lens 04. The reflector 02 has a quasi-ellipsoid surface. The LED light source 01 is disposed at a near focus of the reflector 02. A far focus of the reflector 02 is disposed near a focus of the convex lens 04. Light emitted from the LED light source 01 is converged to the far focus of the reflector 02 after being reflected by using the reflector 02. The light shielding plate 03 is provided with a light shielding portion which is related to the shape of a cutoff line as required by low beam lighting. The light shielding portion is disposed at the focus of the convex lens 04. Finally, light converged near the focus of the convex lens 04 is converted into quasi-parallel light through the convex lens 04 to illuminate a road surface, and form a low beam lighting light shape related to the cutoff line shape of the light shielding plate 03. For high beam lighting, a high beam lighting light shape having a maximum illuminance value is implemented by removing the light shielding plate 03. Such a method for implementing the Emax value and the low beam test value at the 75R test point is limited by a light-emitting feature of the LED light source 01 (approximating Lambertian divergence).

Scattered light emitted from the LED light source 01 also has a large divergence angle after being converged to the far focus of the reflector 02 by using the reflector 02. Due to the large divergence angle, when light reaches the incident surface of the convex lens 04, the intensity of radiant light has already been greatly weakened. Consequently, a lighting light shape of a quasi-parallel light finally obtained through conversion through the convex lens 04 can hardly implement a large Emax value and a low beam test value at the 75R test point, or needs to increase an output luminous flux of the LED light source 01 to implement the high beam Emax value and the low beam test value at the 75R test point as required by the rule.

Increasing the output luminous flux of the LED light source 01 requires an increase in a heat dissipation capability of a heat dissipation system that dissipates heat of the LED light source 01, and causes problems such as an increase of power resulting from an increase in an input current of the LED light source 01, and an increase of output power of a voltage stabilization module of the LED light source 01. More importantly, restricted by a lighting capability of the LED light source 01, the output luminous flux of the LED light source 01 also has a limit value, and cannot be increased infinitely. In this case, two or even more lighting systems are often needed to implement a high beam or low beam lighting function together. This results in complex structure and increased weight and costs. When light is incident to the incident surface of the convex lens 04 at a large scattering angle, dispersion easily occurs after the light is refracted twice on the incident surface and an out-light surface of the convex lens 04.

FIGS. 2 to 11 show embodiments of a light source module based on a graded index lens according to the present disclosure. The light source module based on a graded index lens in this embodiment comprises a light source 1 and a graded index lens 2. The graded index lens 2 is disposed in front of the light source 1. Light emitted from the light source 1 is incident to an incident surface of the graded index lens 2, and is emitted from an out-light surface 2a of the graded index lens 2 after being refracted and converged by the graded index lens 2.

The light source 1 in this embodiment is a planar light source with Lambertian divergence, the light source 1 may be, for example, an LED light source or a laser light source. Refractive indexes of the graded index lens 2 in this embodiment may be distributed in stepped or graded descending order from a center to a periphery. The two distribution both can converge the light emitted from the light source 1.

Figure 2:
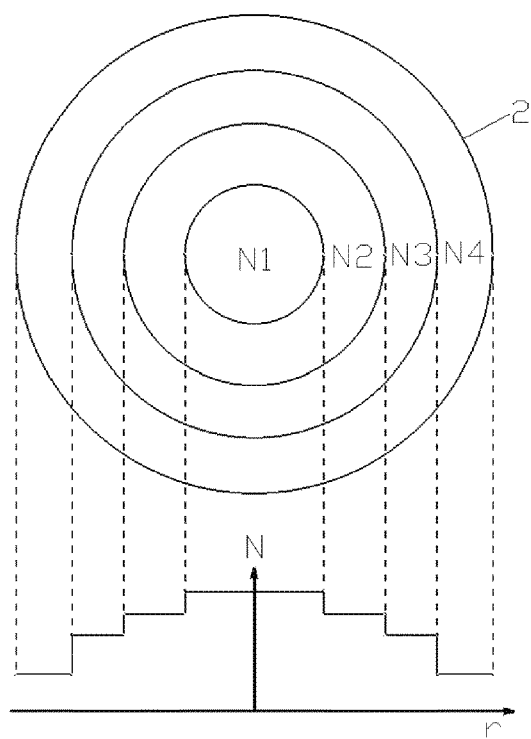
FIG. 2 is a schematic diagram of a first type of refractive index distribution of a graded index lens in a light source module according to an embodiment of the present disclosure, wherein refractive indexes of the graded index lens are distributed in stepped descending order of sequentially cascading in a circumferential direction radially from a center to a periphery.
Figure 3:
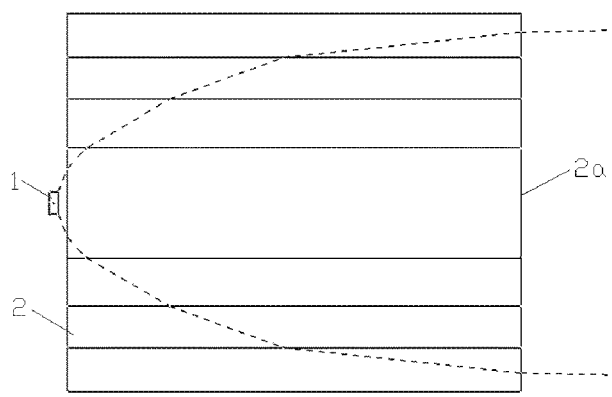
FIG. 3 is a schematic diagram of a principle of optics when a light source module uses the graded index lens shown in FIG. 2 according to an embodiment of the present disclosure.

Referring to FIG. 2, in a first implementation, refractive indexes N of the graded index lens 2 are distributed in stepped descending order from a center to a periphery. The stepped descending order is sequentially cascading in a circumferential direction radially from the center to the periphery of the graded index lens 2. To be specific, a cross section of the graded index lens 2 is divided, according to different refractive indexes N, into a plurality of concentric rings centering on the center of the graded index lens 2. A single ring has a same refractive index N. The refractive indexes N of all rings are in stepped descending order from the center to the periphery of the graded index lens 2. Referring to FIG. 3, the light emitted from the light source 1 is incident to the incident surface of the graded index lens 2, can be effectively converged after being refracted by layers of rings on the graded index lens 2, and can be emitted from the out-light surface 2a of the graded index lens 2 at a small divergence angle with large optical radioactive energy.

Figure 4:
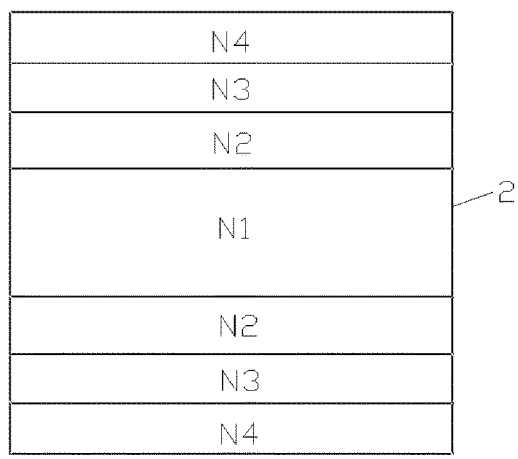
FIG. 4 is a schematic diagram of a second type of refractive index distribution of a graded index lens in a light source module according to an embodiment of the present disclosure, wherein refractive indexes of the graded index lens are distributed in stepped descending order of sequentially cascading along a normal of a central plane from the central plane to a periphery.
Figure 5:
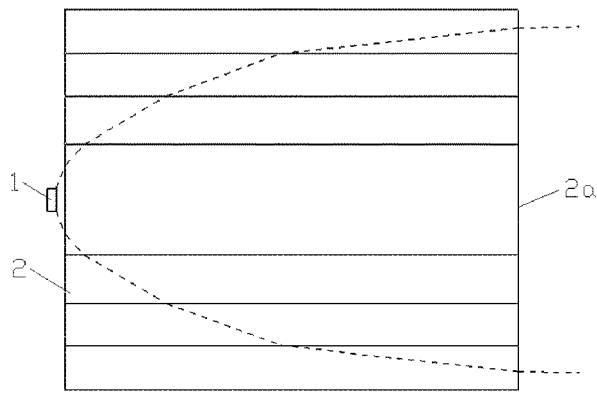
FIG. 5 is a schematic diagram of a principle of optics when a light source module uses the graded index lens shown in FIG. 4 according to an embodiment of the present disclosure.

Referring to FIG. 4, in a second implementation, refractive indexes N of the graded index lens 2 are distributed in stepped descending order from a center to a periphery. The stepped descending order is sequentially cascading along a normal of a central plane from the central plane to the periphery of the graded index lens 2. To be specific, a longitudinal section (a normal section of the central plane) of the graded index lens 2 is divided, according to different refractive indexes N, into a plurality of layers along the normal of the central plane. A single ring has a same refractive index N. The refractive indexes N on all the layers are in stepped descending order along the normal of the central plane from the central plane to the periphery of the graded index lens 2. Referring to FIG. 5, the light emitted from the light source 1 is incident to the incident surface of the graded index lens 2, can be effectively converged after being refracted by the layers on the graded index lens 2, and can be emitted from the out-light surface 2a of the graded index lens 2 at a small divergence angle with large optical radioactive energy.

Figure 6:
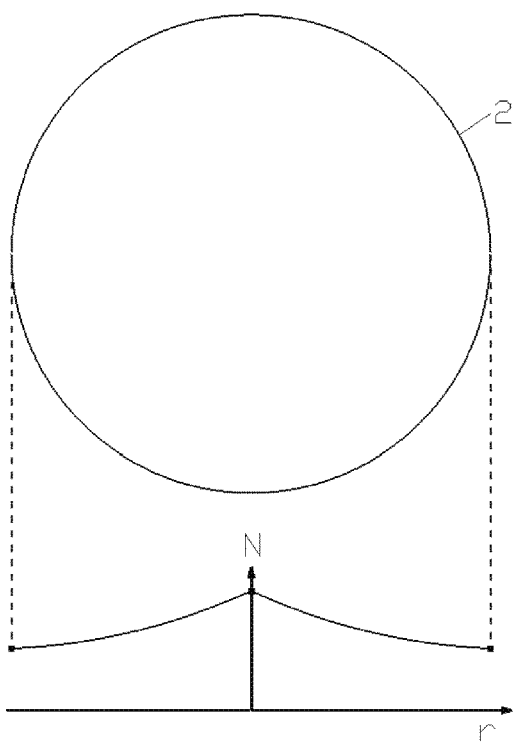
FIG. 6 is a schematic diagram of a third type of refractive index distribution of a graded index lens in a light source module according to an embodiment of the present disclosure, wherein refractive indexes of the graded index lens are distributed in radially graded descending order from a center to a periphery.
Figure 7:
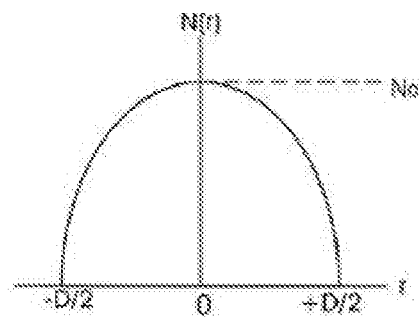
FIG. 7 is a refractive index distribution curve of the graded index lens shown in FIG. 6.
Figure 8:
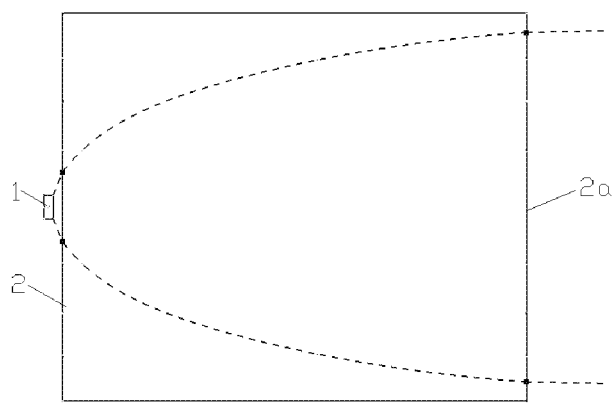
FIG. 8 is a schematic diagram of a principle of optics when a light source module uses the graded index lens shown in FIG. 6 according to an embodiment of the present disclosure.

Referring to FIG. 6, in a third implementation, refractive indexes N of the graded index lens 2 are distributed in graded descending order from a center to a periphery. Referring to FIG. 7, when the refractive indexes N of the graded index lens are distributed in radially graded descending order from a center to a periphery, a distribution curve of refractive index N of the graded index lens 2 is:

$$N(r) = N_0\left(1 - \frac{A}{2}r^2\right),$$

where in the equation, N is a refractive index of the graded index lens 2, $N_0$ is a central refractive index of the graded index lens 2, r is a radius of the graded index lens 2, and A is a refractive index distribution constant of the graded index lens. In FIG. 7, D is a diameter of the graded index lens 2. Referring to FIG. 8, the light emitted from the light source 1 is incident to the incident surface of the graded index lens 2, can be effectively converged after being continuously refracted by the graded index lens 2, and can be emitted from the out-light surface 2a of the graded index lens 2 at a small divergence angle with large optical radioactive energy.

Figure 9:
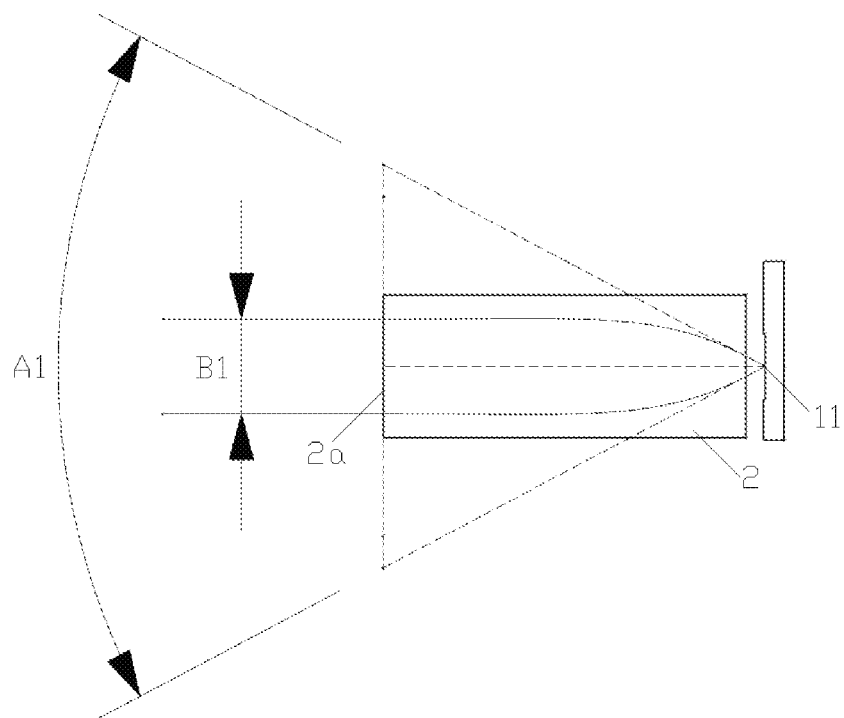
FIG. 9 is a schematic diagram of a principle of optics that when a light source module uses a point light source, light emitted from the point light source is refracted and converged by using a graded index lens according to an embodiment of the present disclosure.

Referring to FIG. 9, when the light source 1 is a single point light source 11, light emitted from the single point light source 11 is converged by the graded index lens 2 in front of the single light source 11. A divergence angle B1 of the light emitted from the emitting surface 2a of the graded index lens 2 is much smaller than a divergence angle A1 of the light emitted from the single point light source 11 without the graded index lens 2.

Figure 10:
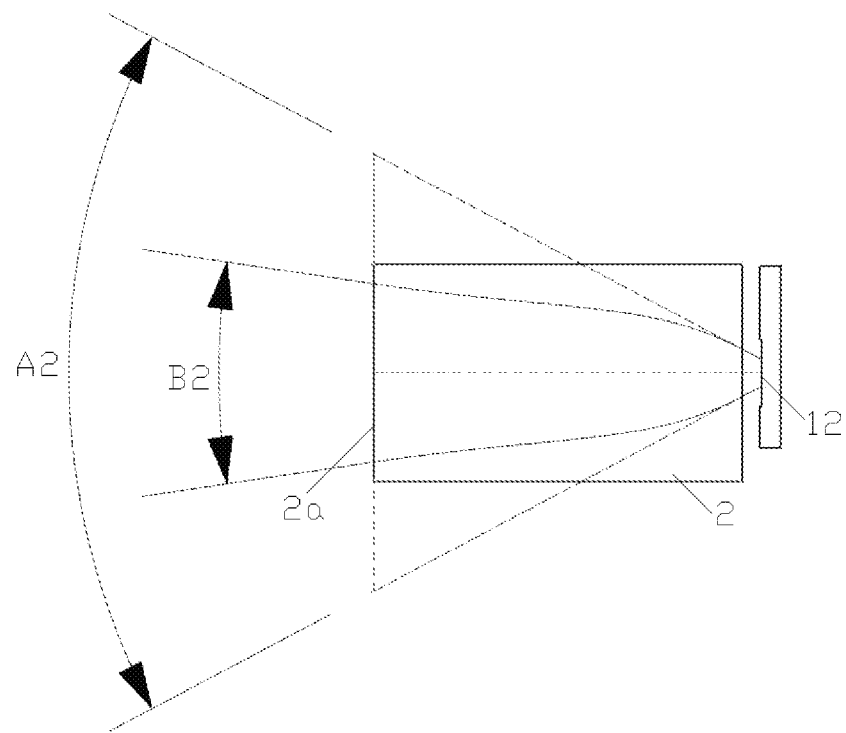
FIG. 10 is a schematic diagram of a principle of optics that when a light source module uses a planar light source, light emitted from the planar light source is refracted and converged by using a graded index lens according to an embodiment of the present disclosure.

Referring to FIG. 10, when the light source 1 is a planar light source 12, light emitted from the planar light source 12 is converged by the graded index lens 2 in front of the planar light source 12. A divergence angle B2 of the light emitted from the out-light surface 2a of the graded index lens 2 is much smaller than a divergence angle A2 of the light emitted from the planar light source 12 without graded index lens 2.

Therefore, according to the light source module in this embodiment, the graded index lens 2 is disposed in front of the light source 1, and the graded index lens 2 converges the light emitted from the light source 1, so that the light has large optical radioactive energy and a small divergence angle on the out-light surface 2a of the graded index lens 2.

Figure 11:
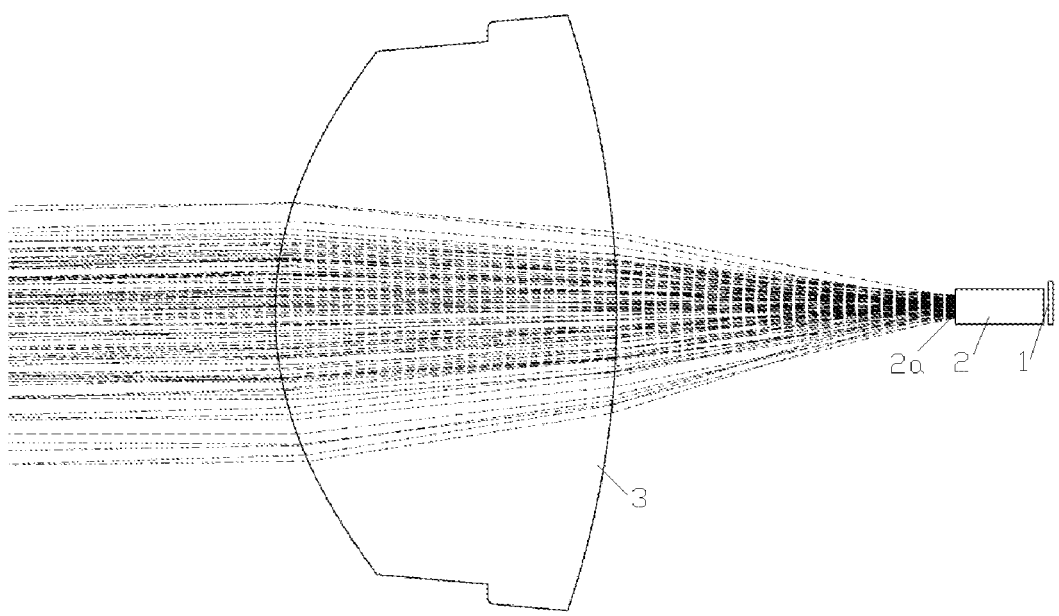
FIG. 11 is a schematic diagram of a principle of optics when a light source module and a convex lens are used in cooperation according to an embodiment of the present disclosure.

Therefore, when the out-light surface 2a of the graded index lens 2 is used as a new planar light source to cooperate with other light distribution parts of the lamp, for example, as shown in FIG. 11, when the light source module in this embodiment and a convex lens 3 are used in cooperation, light emitted from the emitting surface 2a of the graded index lens 2 may be collimated by using the convex lens 3, so that the high beam lighting or a part of the high beam lighting can be implemented. In this manner, a large high beam Emax value can be obtained with a small output luminous flux of the light source 1.

Alternatively, the LED light source 01 in the existing lighting system including a high beam lamp and a low beam lamp shown in FIG. 1 is replaced with the light source module in this embodiment, when the light source module in this embodiment is cooperated with the reflector 02, the light shielding plate 03, and the convex lens 04 shown in FIG. 1, the low beam lighting or a part of the low beam lighting function can be implemented. In this manner, a large low beam test value at a 75R test point can be obtained with a small output luminous flux of the light source 1. Therefore, according to the light source module in this embodiment, requirements on light distribution values of different lamp functions can be met, and a high illuminance value that a conventional lamp system can hardly implement can be implemented. In addition, efficiency of the light source 1 can further be improved, sizes of parts of the lamp are reduced, and a structure of the lamp is simplified.

In view of the foregoing light source module based on a graded index lens, a lamp assembly is provided. The lamp assembly in this embodiment comprises the foregoing light source module based on a graded index lens in the foregoing embodiment.

Referring to FIG. 11, in an implementation, the lamp assembly in this embodiment may further comprise a convex lens 3. In the light source module based on a graded index lens, the emitting surface 2a of the graded index lens 2 is disposed at a focus of the convex lens 3. In the lamp assembly, light emitted from the light source 1 is emitted from the emitting surface 2a of the graded index lens 2 after being converged by the graded index lens 2, so that the light has large optical radioactive energy and a small divergence angle on the out-light surface 2a of the graded index lens 2. The convex lens 3 collimates the light emitted from the emitting surface 2a of the graded index lens 2, so that the high beam lighting or a part of the high beam lighting can be implemented. In this manner, a large high beam Emax value can be obtained with a small output luminous flux of the light source 1.

In another implementation, the lamp assembly in this embodiment may further comprise a reflector, a light shielding plate, and a convex lens. The reflector is a quasi-ellipsoid, and has a near focus and a far focus. The emitting surface 2a of the graded index lens 2 in the light source module based on a graded index lens is disposed at the near focus of the reflector. The far focus of the reflector is near the focus of the convex lens. The light shielding plate is located at the focus of the convex lens. In the lamp assembly, the light emitted from the light source 1 is emitted from the emitting surface 2a of the graded index lens 2 after being converged by the graded index lens 2, so that the light has large optical radioactive energy and a small divergence angle on the out-light surface 2a of the graded index lens 2. The light emitted from the emitting surface 2a of the graded index lens 2 is converged to the far focus of the reflector after being reflected by the reflector. The light shielding plate is provided with a light shielding portion which is related to the shape of the cutoff line as required by low beam lighting. The light shielding portion is disposed at the focus of the convex lens.

Finally, light converged near the focus of the convex lens is converted into quasi-parallel light through the convex lens to illuminate a road surface, and form a low beam lighting light shape related to the cutoff line shape of the light shielding portion. In this way, the low beam lighting or a part of the low beam lighting function can be implemented. In this manner, a large low beam test value at a 75R test point can be obtained with a small output luminous flux of the light source 1. In the lamp assembly, the reflector, the light shielding plate, and the convex lens may use the reflector 02, the light shielding plate 03, and the convex lens 04 in the existing lighting system comprising a high beam lamp and a low beam lamp shown in FIG. 1.

Based on the foregoing lamp assembly, an automobile is provided. The automobile in this embodiment comprises the lamp assembly described in the foregoing embodiment.

In conclusion, according to the light source module in the embodiments, a graded index lens 2 is disposed in front of a light source 1, and the graded index lens 2 converges light emitted from the light source 1, so that the light has large optical radioactive energy and a small divergence angle on an emitting surface 2a of the graded index lens 2. Therefore, when the out-light surface 2a of the graded index lens 2 is used as a new planar light source to match other light distribution parts of a lamp, a large high beam Emax value or a large low beam test value at a 75R test point can be obtained with a small output luminous flux of the light source 1, requirements on light distribution values of different lamp functions are met, and a high illuminance value that a conventional lamp system can hardly implement is implemented. In addition, efficiency of the light source 1 can further be improved, sizes of parts of the lamp are reduced, and a structure of the lamp is simplified.

The foregoing descriptions are merely preferred implementations of the present disclosure. It should be noted that a person of ordinary skill in the art may make several improvements or replacements without departing from the technical principle of the present disclosure, and the improvements or replacements shall also fall within the protection scope of the present disclosure.

What is claimed is:

1. A light source module based on a graded index lens, comprising a light source (1) and a graded index lens (2) disposed in front of the light source (1), wherein light emitted from the light source (1) is incident to an incident surface of the graded index lens (2), and is emitted from an emitting surface (2a) of the graded index lens (2) after being refracted and converged by the graded index lens (2);

wherein refractive indexes of the graded index lens (2) are distributed in radially graded descending order from a center to a periphery, and a distribution curve of the refractive index is:

$$N(r) = N_0\left(1 - \frac{A}{2}r^2\right),$$

wherein in the equation, N is a refractive index of the graded index lens (2), $N_0$ is a central refractive index of the graded index lens (2), r is a radius of the graded index lens (2), and A is a refractive index distribution constant of the graded index lens (2).

2. The light source module based on a graded index lens according to claim 1, wherein the light source (1) is a planar light source with Lambertian divergence.

3. The light source module based on a graded index lens according to claim 1, wherein refractive indexes of the graded index lens (2) are distributed in stepped descending order from a center to a periphery.

4. The light source module based on a graded index lens according to claim 3, wherein the stepped descending order is sequentially cascading in a circumferential direction radially from the center to the periphery of the graded index lens (2).

5. The light source module based on a graded index lens according to claim 3, wherein the stepped descending order is sequentially cascading along a normal of a central plane of the graded index lens (2) from the central plane to the periphery of the graded index lens (2).

6. A lamp assembly, comprising the light source module based on a graded index lens according to claim 1.

7. The lamp assembly according to claim 6, wherein the lamp assembly further comprises a convex lens (3), the emitting surface (2a) of the graded index lens (2) in the light source module is disposed at a focus of the convex lens (3).

8. The lamp assembly according to claim 6, wherein the lamp assembly further comprises a reflector, a light shielding plate, and a convex lens, the reflector is a quasi-ellipsoid, the reflector has a near focus and a far focus, the out-light surface (2a) of the graded index lens (2) in the light source module is disposed at the near focus of the reflector, the far focus of the reflector is near a focus of the convex lens, and the light shielding plate is located at the focus of the convex lens.

9. An automobile, comprising the lamp assembly according to claim 6.

* * * * *